H. H. RICH.
CALCULATOR.
APPLICATION FILED JULY 17, 1912.
1,094,594.
Patented Apr. 28, 1914.
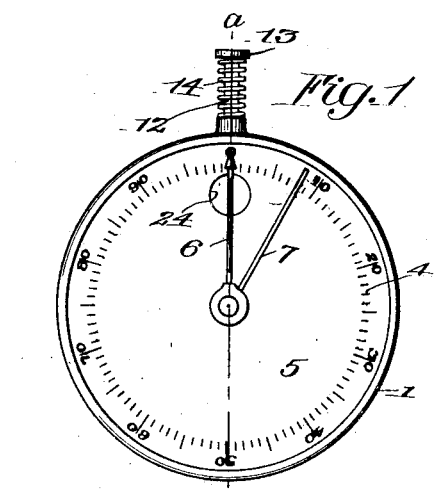
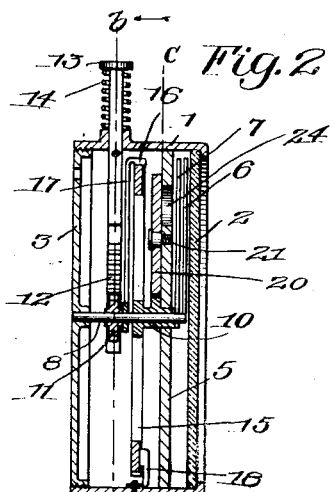
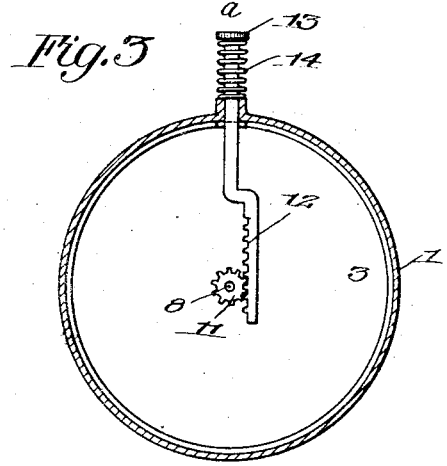
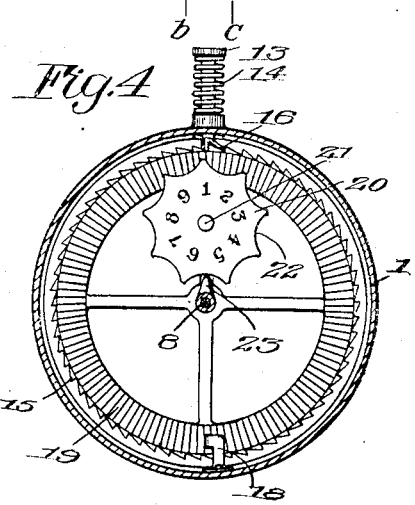
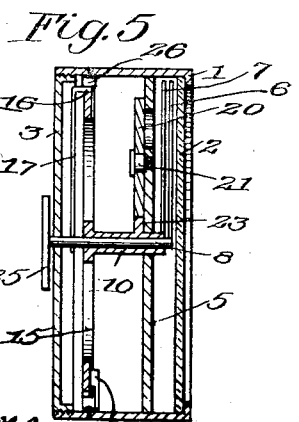
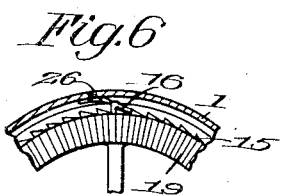
Witnesses
L. M. Simms
A. M. Whitmore
Inventor
Henry H. Rich,
By T. H. Simms
his Attorney

UNITED STATES PATENT OFFICE.

HENRY H. RICH, OF ROCHESTER, NEW YORK.

CALCULATOR.

1,094,594.  Specification of Letters Patent.  Patented Apr. 28, 1914.

Application filed July 17, 1912. Serial No. 709,909.

*To all whom it may concern:*

Be it known that I, HENRY H. RICH, of Rochester, in the county of Monroe and State of New York, have invented a new and useful Improvement in Calculators, which improvement is fully set forth in the following specification and shown in the accompanying drawings.

The present invention relates to calculators and an object thereof is to provide a simple and inexpensive structure which may be employed for calculating the sum of any set of numbers within the range of the machine.

To these and other ends the invention consists in certain parts and combinations of parts, all of which will be hereinafter described, the novel features being pointed out in the appended claims.

In the drawings: Figure 1 is a front view of a calculator constructed in accordance with the present invention; Fig. 2 is a vertical section on the line $a$—$a$ Fig. 1; Fig. 3 is a section on the line $b$—$b$ Fig. 2; Fig. 4 is a section on the line $c$—$c$ Fig. 2; Fig. 5 is a sectional view of another embodiment of the invention; and Fig. 6 is a detail view of some of the interior parts of the embodiment shown in Fig. 5.

According to this invention there may be provided a suitable casing 1 which is preferably of cylindrical form and has a transparent front wall 2 and a removable rear wall 3. Carried by and preferably arranged within the casing is a scale which, in this instance, is in the form of a continuous series of graduations arranged on the face of the disk 5 which is spaced from the transparent wall 2 and has its graduations viewable through such wall. Arranged to operate over this scale 4 are two indexes or pointers 6 and 7 preferably turning about a common axis, and located between the plate 5 and the transparent wall 2.

The pointer 6 may be arranged on a shaft 8 which has bearing at 9 in the wall 3 and also within a hollow shaft 10 to which the pointer 7 is secured. Any suitable means may be employed for rotating the shaft 8 with its pointer 6. In the embodiment shown in Figs. 1 to 4 the shaft 8 has a pinion 11 secured thereto, and meshing with this pinion is a rack bar 12 which is guided in and extends through the casing 1 to the exterior of the latter where it is provided with a finger piece 13. A spring 14 may surround that portion of the rack bar arranged on the exterior of the casing and tends to move the rack bar back to its original position so that the stop 14$^a$ engages the inner face of the casing when pointer 6 is at zero position.

To the end that the pointer 7 shall travel with the pointer 6, when the latter moves in one direction or clockwise, but not otherwise, a clutch connection is preferably provided between these parts. This clutch connection may embody a ratchet wheel 15 rigidly secured to the shaft 10 and lying between the walls 3 and 5, the periphery of this ratchet wheel being toothed and adapted to be engaged by the pawl 16 on the end on the arm 17 which extends radially from the shaft 8.

When the shaft 8 is rotated in one direction to turn the pointer 6 clockwise, the pawl 16 coöperates with the teeth on the periphery of the ratchet wheel 15 and causes the latter to turn with the shaft 8, thus rotating the pointer 7 clockwise. On the return movement of the shaft 8, under the action of the spring 14, the pointer 6 returns to zero position on the scale, while the pointer 7 remains in the position to which it was shifted when the pointer 6 was moved clockwise.

The pointer 7 only travels clockwise and then only when the pointer 6 is likewise shifted clockwise. To hold the pointer 7 against counter clockwise movement, a dog 18 secured to the casing 1 coöperates with teeth 19 on the side face of the wheel 15, this dog permitting the wheel 15 to move in one direction only.

To the end that each rotation of the hand or pointer 7 may be registered, there may be provided the registering device comprising a wheel 20 turning about a bearing 21 on the rear face of the disk 5 and provided with notches 22 at intervals on its periphery. Each time the pointer 7 makes one complete rotation, a projection 23 on the hollow shaft 10 enters one of the notches 22 and shifts the counter wheel 20 a slight distance. The front face of this counter wheel is provided with a series of progressively increasing numbers which are viewable through an opening or window 24.

In the embodiment of the invention shown in Fig. 5, instead of having an operating member separate from the shaft 8, the latter is extended through the rear wall 3, and is provided with the finger piece 25. In addition to this, there is arranged within the casing a spring finger 26 which will yield and permit the upper end of the arm 17 to pass by the same, when moving clockwise, but, when moving counter clockwise, this spring finger acts as a stop to prevent the arm moving beyond the position which will carry the pointer 6 back to zero. Otherwise, the construction of this embodiment is the same as that disclosed in Figs. 1 to 4.

The operations of both embodiments of the invention are substantially the same. With the manipulation of the operating member 25 in one embodiment or 12 in the other embodiment the shaft 8 will be rotated and thus the clutch arm 17, pawl 16 and ratchet wheel 18 will transmit motion to the hollow shaft 10, thus causing the simultaneous rotation of both pointers 6 and 7. Assume that the device is to be used for counting up the total costs of a number of purchases, the pointers 6 and 7 will both initially be located at zero point on the scale 4. When the operating member is actuated, both pointers will move together clockwise to the determined position, as, for instance, the graduation 8 as shown in Fig. 1. The pointer 6 is then returned to zero position independently of the pointer 7, either by means of the spring 14, as shown in Figs. 1 to 4, or manually by means of the finger piece 25 in Fig. 5. With the next purchase, the pointer 6 is again shifted to the graduation indicating the amount of such purchase. With this operation, the pointer 7 will be advanced a like number of graduations, thus indicating the total cost of the two purchases, the pointer 6 of course being returned either automatically or manually to zero position. After the pointer 7 has made one complete rotation, the projection 23 will shift the counter wheel 20 in one direction.

A calculator constructed in accordance with this invention is especially advantageous as it may be built in compact form so as to be carried in the pocket of the user and, in this way, traveling salesmen and others who keep an account of all expenditures may have a complete record of the amount they have spent. When built in larger form, it may be used in stores where a number of items are purchased at one time, so that it will be possible to dispense with the customary mental adding which is both a time consumer and inaccurate, in many instances.

What I claim as my invention and desire to secure by Letters Patent is:

1. A calculator comprising a continuous scale, two indexes movable thereover, one of said indexes being movable in opposite directions and the other being movable in one direction only, an operating member for the first named index, movable in opposite directions, and means causing both indexes to move in one direction with the operating member and releasing one of the indexes, when the other index is moved in the other direction by the operating member.

2. A calculator comprising a continuous scale having a zero point, a pair of pointers mounted to turn about a common axis over said scale, an operating member for moving one of said pointers in either of two directions, a device for causing the other pointer to move with the first named pointer when the latter is moved in one direction, a device for preventing the movement of the second named pointer when the first named pointer is moved in the other direction, and a stop for limiting the independent return movement of the first named pointer to zero on the scale.

3. A calculator comprising a casing, a scale carried thereby, a hollow shaft mounted to turn in the casing and having a pointer thereon movable over the scale, a second named shaft arranged in the hollow shaft and having a pointer thereon also movable over the scale, a clutch connection between the hollow shaft the other shaft causing them to move together in one direction but permitting one of them to turn free of the other in the other direction, an operating member connected to one of the shafts to move the latter in opposite directions, and means for holding the other shaft against rotation when the operating member is reversed.

4. A calculator comprising a circular scale, a suitably mounted hollow shaft having a pointer movable over said scale, a shaft arranged in the hollow shaft and having a pointer also movable over the scale, a clutch connection between the shafts causing both to move together in one direction but permitting one to move independently of the other in the other direction, an operating member connected to the independently movable shaft to move the latter in opposite directions, and means preventing the rotation of the other shaft except when the two shafts are moved together.

5. A calculator comprising a continuous scale having a zero position, two pointers movable about a common center over said scale, an operating member connected to one of the pointers to move the said pointer in opposite direction, a clutch connection between the pointers causing them to move together when the operating member is moved in one direction but permitting the pointer, to which the operating member is connected, to move in the other direction independently of the other pointer, and a spring connected to the operating member for moving, to zero position, the pointer to which the operating member is connected.

6. A calculator comprising a casing, a circular scale carried thereby, a hollow shaft within the casing carrying a pointer movable over the scale, a shaft turning in the hollow shaft and having a pointer movable over the scale, a toothed wheel carried by the hollow shaft, a pawl carried by the other shaft for engaging the toothed wheel, when moving in one direction, but slipping over said toothed wheel, when moving in the other direction, an operating member connected to the shaft to which the pawl is secured, and a dog for coöperating with the ratchet wheel to prevent the latter moving in the direction opposite to that in which it is carried by the pawl.

7. A calculator comprising a casing, a circular scale carried thereby, a shaft in said casing having a pointer thereon movable over the scale, an operating member connected to the shaft, a spring for returning the pointer to zero position, a second pointer, a hollow shaft carrying the second named shaft, and a clutch connection between the shafts causing the two to move together when the first named pointer is moved from zero point but permitting one of the shafts to move independently in the other direction.

H. H. RICH.

Witnesses:
HAROLD H. SIMMS,
ADA M. WHITMORE.